Patented Feb. 8, 1949

2,460,932

UNITED STATES PATENT OFFICE 2,460,932

YELLOW AZO DYESTUFFS

Norman Hulton Haddock and Clifford Wood, Blackley, Manchester, England, assignors to Imperial Chemical Industries Limited, a corporation of Great Britain No Drawing. Application April 13, 1945, Serial No. 588,238. In Great Britain May 8, 1944

7 Claims. (Cl. 260—158)

1

The present invention relates to the manufacture of new yellow azo dyestuffs and in particular to such dyestuffs as are ternary sulphonium salts derived from 4:4'-dibenzthiazyl-(2)-azobenzene and are suitable for dyeing cellulosic material.

We have found that if di-(methylmercapto)-4:4'-di-(6 - methylbenzthiazyl-2) - azobenzene is converted to a ternary sulphonium salt by reaction with, for example, dimethyl sulphate, a compound is obtained which dissolves readily in water to form a yellow solution which dyes cotton yellow. In carrying out such a dyeing it is advantageous that there be present in the dyebath a mild alkali, for instance, sodium carbonate. In this way bright yellow shades are obtained which possess excellent fastness to washing. Ternary sulphonium salts having similar properties may also be obtained from other di-(alkylmercapto) derivatives of 4:4'-di(6-methylbenzthiazyl-2)-azobenzene; also other esters may be employed in place of dimethyl sulphate as indicated below.

Accordingly the present invention relates to a process for the manufacture of new yellow azo dyestuffs which comprises heating a 4:4'-dibenzthiazyl-(2)-azobenzene which carries as substituents two alkyl-(1-4C)-mercapto or two alkyl (1-4C) - or aralkyl-mercaptomethyl groups and optionally, directly attached to itself or to the aforesaid aralkylmercapto -methyl groups, one or more halogen, alkyl (1-4C) or alkoxy (1-4C) radicals, with a di-alkyl (1-4C) sulphate or sulphite.

Examples of starting materials used in the present invention are:

Di-(methylmercapto)-chloro-4:4'-di(6-methylbenzthiazyl-2)-azobenzene (made by treating 4:4'-di(6-methylbenzthiazyl-2)-azobenzene with a sulphur chloride-aluminium chloride complex by the process of copending application No. 19,-349/43 (British Patent 573,831/1943, U. S. Patent 2,369,666), reducing to the chloromercapto derivative and methylating with dimethylsulphate), di-(methylmercaptomethyl) - 4:4'-di(6-methylbenzthiazyl-2)-azobenzene (made by chloromethylating 4:4'-di(6-methylbenzthiazyl-2)-azobenzene with dichlorodimethyl ether and treating the resulting di - (chloromethyl)-4:4'-di(6-methylbenzthiazyl-2)-azobenzene with methyl mercaptan), di(methylmercaptomethyl) - 4:4'-di(benzthiazyl - 2) - azobenzene, di(methylmercaptomethyl)-4:4'-di(6-ethoxybenzthiazyl-2)-azobenzene, di(ethylmercaptomethyl)-4:4'-di-(6-methylbenzthiazyl-2)-azobenzene, di(butylmercaptomethyl)-4:4'-di(6-methylbenzthiazyl-2)-azobenzene and di(benzylmercaptomethyl)-4:4'-di(6-

2 methylbenzthiazyl-2)-azobenzene. As examples of dialkyl sulphates and sulphites there are mentioned dimethyl sulphate and dimethyl sulphite.

The starting compound di-(methyl-mercapto)-chloro-4,4'-di-(6 - methylbenzthiazyl-2)-azobenzene may be made as described in application of Great Britain No. 19,349/43, according to which 10 parts of 4,4'-di(6-methylbenzthiazyl)-azobenzene are added to 50 parts of sulfur chloride-aluminum chloride complex at 10°–20° C. and the mixture is stirred at 20° C. for three hours. The resulting orange-red solution is poured into 500 parts of 10% hydrochloric acid. A pale brown precipitate is thrown down which is filtered off and washed well with water. It is then extracted with 400 parts of 3% aqueous boiling sodium hydroxide, filtered, washed with water, dried and finally extracted with carbon bisulfide. The product dissolves in dilute sodium sulfide. The sulfur chloride-aluminum chloride complex may be prepared as by heating the two agents together in suitable proportions by weight so as to produce the constitution $AlCl_3 2S_2Cl_2$, the specific gravity referring to water being 1.784 (Ruff and Golla, Zeit. f. anorg. u. algem. chemie, vol. 138, pages 17–32; Zentralblatt, 1924, II, 1570).

The present new dyestuffs are, as already indicated above, ternary sulphonium salts. They dye cotton in bright yellow shades, advantageously, from a dyebath containing a mild alkali, such as sodium carbonate or sodium bicarbonate. The use of the present new dyestuffs in such a dyebath, namely one containing mild alkali, constitutes a further feature of the present invention.

The yellow shades obtained upon cotton by means of the present dyestuffs possess very good fastness to washing, open soda boiling and soda ash treatment, their fastness in these respects being equal to that of dyeings of Caledon Yellow G (Colour Index No. 1241). Their light fastness is also very good.

The following examples in which the parts are by weight, illustrate but do not limit the invention.

Example 1

12 parts of di-(methylmercapto)-chloro-4:4'-di-(6-methylbenzthiazyl-2)-azobenzene (made as described below) are heated with 60 parts of dimethyl sulphate at 120–125° C. for half an hour. The brown solution which forms is cooled and poured into 400 parts of acetone. The precipitated ternary sulphonium salt is filtered off and washed with acetone to remove the excess of dimethyl sulphate. A brownish yellow powder is thus obtained.

The chloro di(methylmercapto) - 4:4' - di(6-methylbenzthiazyl-2)-azobenzene (containing 1.3 atoms of chlorine per molecule) employed above is made as follows. 10 parts of the polydisulphide of chlorodimercapto - 4:4'-di(6-methylbenzthiazyl-2)-azobenzene (containing 1.3 atoms of chlorine per mol.) obtained as described in Example No. 38 of copending British application No. 19,349/43, are mixed with 100 parts of water, 15 parts of 32% aqueous sodium hydroxide solution and 15 parts of sodium sulphide crystals. The mixture is boiled for half an hour. The solution of the sodium salt of the resulting mercaptan is cooled. 60 parts of methyl iodide are added with vigorous agitation. A glutinous brown precipitate forms. The mixture is heated during ½ hour to 90° C. by which time the precipitate has solidified. It is filtered off, and constitutes the methyl ester of the aforesaid mercaptan. For the sake of purification it is made into a paste with alcohol, placed upon a filter and washed with further alcohol. Finally it is washed free from alkali with water, and dried. The yield is 12 parts.

1 part of the dyestuff so obtained is dissolved in 1500 parts of water at 30° C. 50 parts of bleached cotton yarn are introduced into the solution. The temperature is raised to 60° C. and maintained thereat for 30 minutes. 0.5 part of soda ash is now added and the dyeing is continued for a further 15 minutes at 60° C. The cotton is removed, rinsed with water and dried. It is bright reddish yellow in shade. The dyeing possesses good fastness to washing and open soda boiling being similar to that of dyeings of Caledon Yellow G (Colour Index No. 1241).

*Example 2*

5 parts of di(methylmercaptomethyl)-4:4'-di-(benzthiazyl-2)-azobenzene (made as described below) are heated with 36 parts of dimethyl sulphate at 160° C. for half an hour. The mixture is then cooled and poured into acetone. The precipitated ternary sulphonium salt is filtered off, washed with acetone and dried in the air. A pale yellow powder is obtained. It dyes cotton a yellow shade using a dyebath containing a mild alkali as described in Example 1.

The di(methylmercaptomethyl) - 4:4' - dibenzthiazyl-2-azobenzene employed above is made as follows: 5 parts of di(chloromethyl) - 4:4' - di-(benzthiazyl-2)-azobenzene are mixed with 80 parts of β-ethoxyethanol. 1.5 parts of sodium methyl mercaptide are added, the mixture is heated to 110-115° C. and maintained at this temperature for two hours. The mixture obtained is poured into 316 parts of ethanol and stirred vigorously for four hours, filtered and the filter-cake is washed with ethanol and then with water. The product is dried in the air. A bright yellow powder is obtained.

*Example 3*

5 parts of di(methylmercaptomethyl)-4:4'-di-(6-methylbenzthiazyl-2)-azobenzene (made as described below) are heated with 36 parts of dimethylsulphate at 90-95° C. for half an hour. The solution which forms is cooled and poured into 200 parts of acetone. The precipitated ternary sulphonium salt is filtered off, washed with acetone and dried in the air. A yellow powder is obtained which dyes cotton a bright yellow shade greener than the shade from the product of Example 1 and possessing similarly high fastness to washing and soda boiling.

The di(methylmercaptomethyl) - 4:4' - di(6-methylbenzthiazyl - 2) - azobenzene employed above is made by the method described in Example 2 for the preparation of di(methylmercaptomethyl)-4:4'-di(benzthiazyl-2)-azobenzene.

*Example 4*

5 parts of di(methylmercaptomethyl)-4:4'-di-(6-ethoxybenzthiazyl - 2) - azobenzene (made as described below) are heated with 36 parts of dimethyl sulphate at 115-120° C. for two hours. The so obtained solution is cooled and poured into 200 parts of acetone. The precipitated ternary sulphonium salt is filtered off, washed with acetone and dried in the air. A dull yellow powder is obtained, which when dyed on to cotton by the same process as that described in Example 1 gives a yellow shade.

The di(methylmercaptomethyl) - 4:4' - di(6-ethoxybenzthiazyl-2)-azobenzene employed in the above example may be made as follows:

5 parts of di(chloromethyl)-4:4'-di(6-ethoxybenzthiazyl-2)-azobenzene are mixed with 80 parts of β-ethoxyethanol. 1.5 parts of sodium methyl mercaptide are added, the mixture is heated to 110-115° C. and maintained at this temperature for two hours.

The product is poured into 1,000 parts of slightly acidified water and the mixture is stirred for four hours, then filtered and the filter-cake is washed with water. The product is dried in the air and consists of bright yellow powder.

*Example 5*

5 parts of di(ethylmercaptomethyl)-4:4'-di-(6-methylbenzthiazyl-2)-azobenzene (made as described below) are heated with 36 parts of dimethyl sulphate at 90-95° C. for half an hour. The mixture is cooled and poured into acetone. The precipitated ternary sulphonium salt is filtered off, washed with acetone and dried in the air. The product obtained can be used to dye cotton in a yellow shade, as described in Example 1.

The di(ethylmercaptomethyl)-4:4'-di(6-methylbenzthiazyl-2)-azobenzene employed above may be made as follows: 2 parts of sodium are dissolved in 41 parts of β-ethoxyethanol, 5.6 parts of ethyl mercaptan are added and the mixture is stirred. 5 parts of di(chloromethyl)-4:4'-di(6-methylbenzthiazyl-2)-azobenzene are then added gradually. The mixture is heated under reflux for 2 hours, allowed to cool and poured into 400 parts of ethyl alcohol. The suspension is stirred vigorously for four hours. The di(ethylmercaptomethyl)-4:4'-di(6-methylbenzthiazyl - 2) - azobenzene is filtered off, washed with ethyl alcohol and then with water. It is dried in the air and consists of bright yellow powder.

*Example 6*

5 parts of di(butylmercaptomethyl)-4:4'-di(6-methylbenzthiazyl-2)-azobenzene (made as described below) are heated with 36 parts of dimethyl sulphate at 120° C. for half an hour. The ternary sulphonium salt is isolated as described in Example 5. It dyes cotton a yellow shade.

The di(butylmercaptomethyl)-4:4'-di(6-methylbenzthiazyl-2)-azobenzene employed above may be made as follows: 2 parts of sodium are dissolved in 41 parts of β-ethoxyethanol, 6.8 parts of butyl mercaptan are added and the mixture is stirred. 5 parts of di(chloromethyl)-4:4'-di(6-methylbenzthiazyl - 2) - azobenzene are added gradually to the mixture. It is then heated under reflux for two hours. The product is isolated as described in Example 5. A yellow powder is obtained.

Example 7

5 parts of di(benzylmercaptomethyl)-4:4'-di-(6-methylbenzthiazyl-2)-azobenzene (made as described below) are heated with 36 parts of dimethyl sulphate at 90–95° C. for half an hour. The solution so obtained is cooled and poured into 200 parts of acetone. The precipitated ternary sulphonium salt is filtered off. It dyes cotton in a yellow shade by the process described in Example 1.

The di(benzylmercaptomethyl) - 4:4' - di(6-methylbenzthiazyl - 2) - azobenzene employed above may be made as follows: 2 parts of sodium are dissolved in 41 parts of β-ethoxyethanol. 10.82 parts of benzyl mercaptan are added and the mixture stirred. 5 parts of di(chloromethyl)-4:4'-di(6-methylbenzthiazyl - 2)- azobenzene are added gradually. The mixture is stirred under reflux for two hours. The product is isolated as described in Example 5. A yellow powder is obtained.

We claim:

1. The process of manufacturing a di-methosulfate of an azobenzene which comprises making a mixture of a di-alkyl sulfate having 1 to 4 carbons and a compound of the group consisting of the chloro derivative of di-(methylmercapto)-4,4'-di(6-methylthiazyl)-(2)-azobenzene which contains 1.3 atoms of chlorine per molecule and the compounds represented by the formula in which X is one of the group consisting of hydrogen, methyl and methoxy, and Y is one of the group consisting of alkyl having 1 to 4 carbons and benzyl; and heating the mixture at reaction temperature until there is formed the corresponding methyl methosulfate.

2. The process in accordance with claim 1 in which the compound mixed with the di-alkyl sulfate is di-(methyl mercapto)-chloro-4,4'-di(6-methylbenzthiazyl-2)-azobenzene.

3. The process in accordance with claim 1 in which the compound mixed with the di-alkyl sulfate is di-(methylmercaptomethyl)-4,4'-di-(6-methylbenzthiazyl-2)-azobenzene.

4. A di-methosulfate of an azobenzene made by making a mixture of a dialkyl sulfate having 1 to 4 carbons and a compound of the group consisting of the chloro derivative of di-(methylmercapto)-4,4'-di(6-methylbenzthiazyl)-(2)-azobenzene which contains 1.3 atoms of chlorine per molecule and the compounds represented by the formula in which X is one of the group consisting of hydrogen, methyl and methoxy, and Y is one of the group consisting of alkyl having 1 to 4 carbons and benzyl, and heating the mixture at reaction temperature until there is formed the corresponding di-mercaptomethosulfate.

5. A compound represented by the formula wherein X is one of the group consisting of hydrogen, methyl and methoxy; and Y is one of the group consisting of alkyl having 1 to 4 carbons and benzyl.

6. The chloro derivative of the compound represented by the formula which contains 1.3 atoms of chlorine per molecule.

7. The compound represented by the formula

NORMAN HULTON HADDOCK.
CLIFFORD WOOD.

REFERENCES CITED

The following references are of record in the file of this patent:

UNITED STATES PATENTS

| Number | Name | Date |
|---|---|---|
| 2,368,657 | Haddock | Feb. 6, 1945 |
| 2,368,658 | Haddock | Feb. 6, 1945 |
| 2,384,283 | Conrad et al. | Sept. 4, 1945 |